(12) United States Patent
Porte et al.

(10) Patent No.: US 8,413,922 B2
(45) Date of Patent: Apr. 9, 2013

(54) ACOUSTIC PROCESSING STRUCTURE PARTICULARLY ADAPTED TO THE AIR INLET OF AN AIRCRAFT NACELLE

(75) Inventors: Alain Porte, Colomiers (FR); Jacques Lalane, Saint Orens de Gameville (FR); Fabrice Gantie, Toulouse (FR); Jacques Barillot-Creuzet, Marmande (FR)

(73) Assignees: Creuzet Aeronautique, Marmande (FR); Airbus Operation SAS, Toulouse (FR)

(*) Notice: Subject to any disclaimer, the term of this patent is extended or adjusted under 35 U.S.C. 154(b) by 0 days.

(21) Appl. No.: 12/809,742

(22) PCT Filed: Dec. 16, 2008

(86) PCT No.: PCT/FR2008/052312
§ 371 (c)(1),
(2), (4) Date: Jun. 21, 2010

(87) PCT Pub. No.: WO2009/081020
PCT Pub. Date: Jul. 2, 2009

(65) Prior Publication Data
US 2010/0276548 A1    Nov. 4, 2010

(30) Foreign Application Priority Data
Dec. 21, 2007 (FR) ..................... 07 60194

(51) Int. Cl.
*B64D 33/02* (2006.01)
*B64D 15/04* (2006.01)

(52) U.S. Cl.
USPC ....... 244/1 N; 244/53 B; 244/134 B; 181/214

(58) Field of Classification Search .......... 244/1 N, 244/53 B, 134 B; 181/210, 214; 137/15.1
See application file for complete search history.

(56) References Cited

U.S. PATENT DOCUMENTS 3,033,734 A * 5/1962 Price ............... 156/305
3,913,702 A * 10/1975 Wirt et al. ............ 181/286

(Continued)

FOREIGN PATENT DOCUMENTS

DE    2 314 396    6/1974
EP    1 232 944    8/2002

(Continued)

OTHER PUBLICATIONS

International Search Report dated May 20, 2009, from corresponding PCT application.

*Primary Examiner* — Tien Dinh
*Assistant Examiner* — Richard R Green
(74) *Attorney, Agent, or Firm* — Young & Thompson

(57) ABSTRACT

An acoustic treatment structure related to a leading edge onto which an aerodynamic stream flows, in particular at an air intake of an aircraft nacelle, includes—from the outside to the inside—at least one acoustically resistive substructure (30), at least one alveolar substructure including strips (32) of cells, arranged in a direction that is essentially perpendicular to the direction of flow of the aerodynamic stream, and at least one reflective layer (34). Each strip (32) includes a first part that insulates the strips from one another, called a support, with a U-shaped cross-section in the longitudinal direction, whose open surface that is opposite to the bottom of the U shape is flattened against the acoustically resistive substructure (30), and at least a second part, called partitioning, making it possible to partition the space that is delimited by the support and the acoustically resistive substructure (30) into cells.

18 Claims, 4 Drawing Sheets

U.S. PATENT DOCUMENTS

| | | | |
|---|---|---|---|
| 3,983,955 A | | 10/1976 | Vasiljevic |
| 4,298,090 A | * | 11/1981 | Chapman ...................... 181/292 |
| 4,787,473 A | * | 11/1988 | Fuchs et al. ................... 181/286 |
| 4,858,721 A | * | 8/1989 | Autie et al. .................... 181/214 |
| 5,228,643 A | * | 7/1993 | Manda et al. .............. 244/134 B |
| 5,841,079 A | * | 11/1998 | Parente ..................... 244/134 B |
| 6,457,676 B1 | * | 10/2002 | Breer et al. ............... 244/134 B |
| 6,592,078 B2 | | 7/2003 | Porte et al. |
| 6,698,691 B2 | | 3/2004 | Porte |
| 6,772,857 B2 | | 8/2004 | Porte et al. |
| 7,328,771 B2 | * | 2/2008 | Costa et al. .................. 244/53 B |

FOREIGN PATENT DOCUMENTS

| | | |
|---|---|---|
| EP | 1 232 945 | 8/2002 |
| EP | 1 398 473 | 3/2004 |

\* cited by examiner

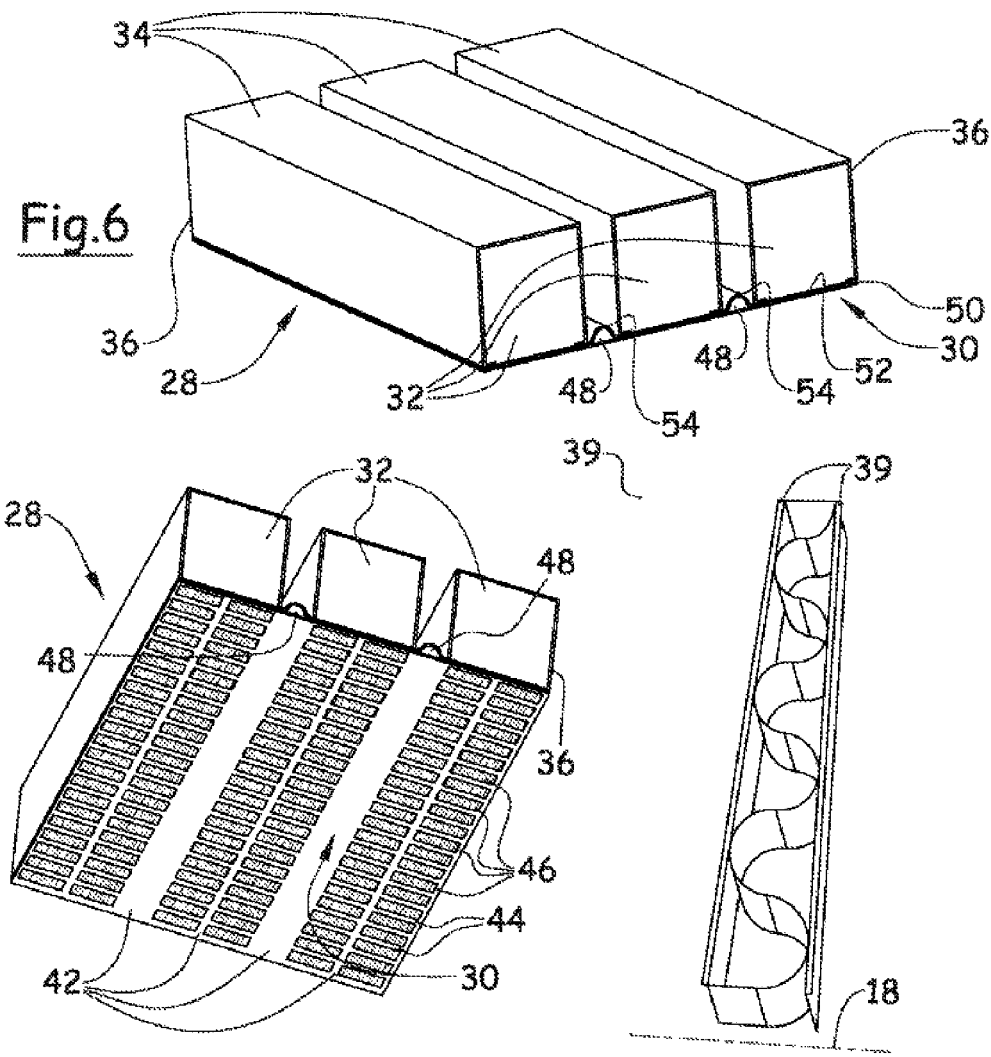
Fig.6
Fig.7
Fig.8
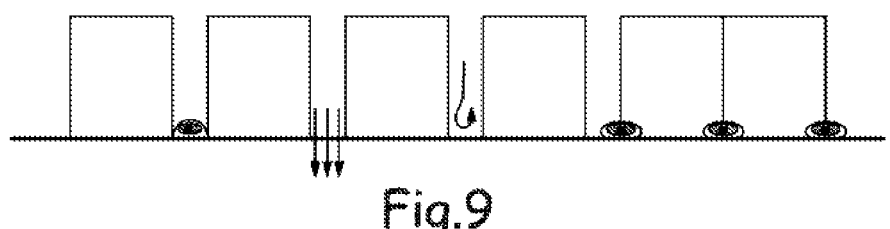
Fig.9

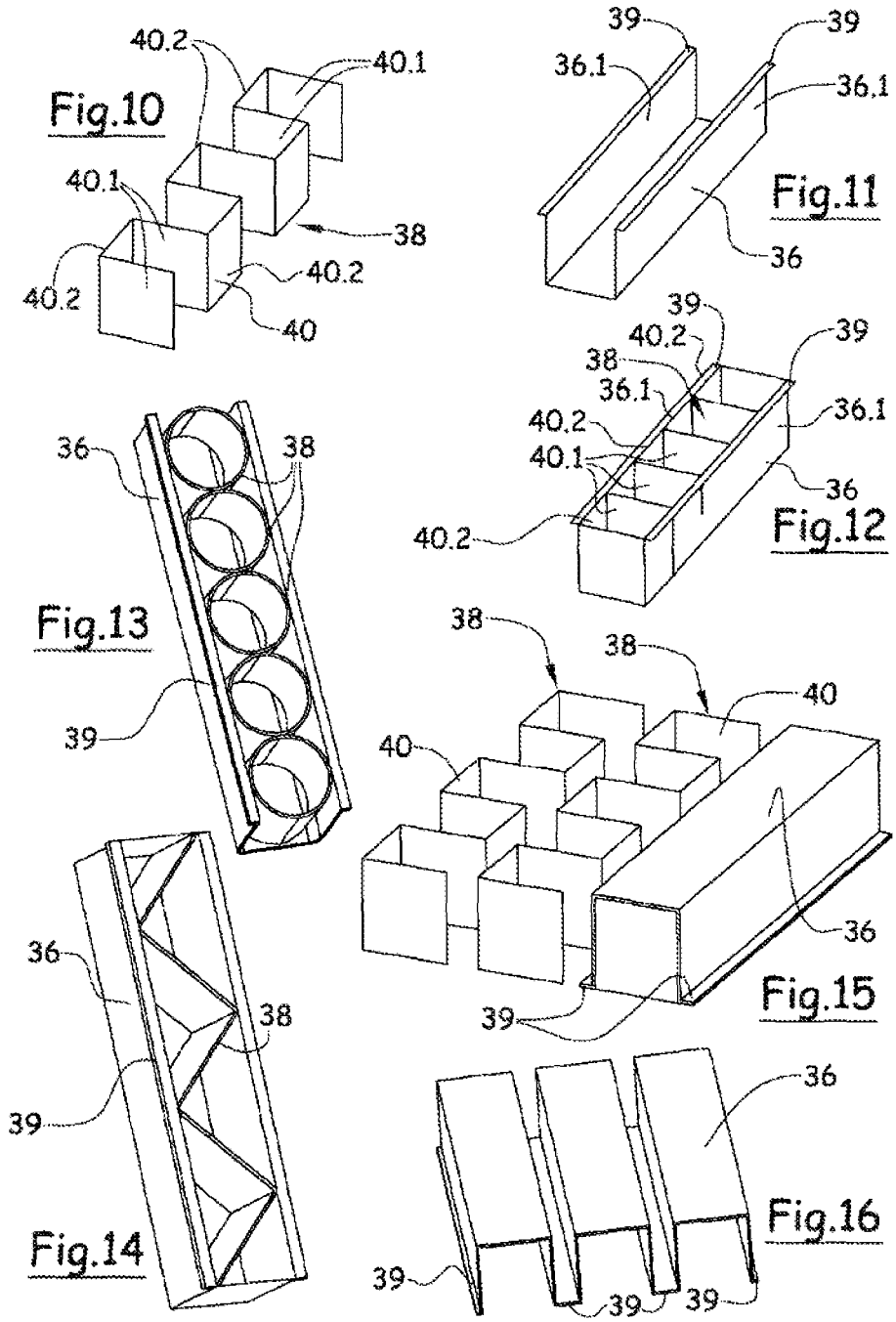

ACOUSTIC PROCESSING STRUCTURE PARTICULARLY ADAPTED TO THE AIR INLET OF AN AIRCRAFT NACELLE

This invention relates to an acoustic treatment structure that is more particularly suited to an air intake of an aircraft nacelle.

To limit the impact of noise pollution close to airports, the international standards are increasingly restrictive as far as sound emissions are concerned.

Techniques have been developed for reducing the noise emitted by an aircraft and in particular the noise that is emitted by a propulsion system, by arranging, at pipe walls, panels, coatings or structures that are intended to absorb a portion of the sound energy, in particular by using the principle of Helmholtz resonators. In a known way, an acoustic treatment structure comprises—from the outside to the inside—an acoustically resistive porous layer, at least one alveolar substructure, and a reflective or impermeable layer.

Layer is defined as one or more layers that may or may not be of the same type.

The acoustically resistive porous layer is a porous structure that has a dissipative role, partially transforming the acoustic energy of the sound wave that passes through it into heat. It comprises so-called open zones that allow acoustic waves to pass and other so-called closed or filled zones that do not allow acoustic waves to pass but are designed to ensure the mechanical strength of said layer. This acoustically resistive layer is characterized in particular by an open surface ratio that considerably varies based on the engine, and components that constitute said layer.

The alveolar substructure is delimited by a first imaginary surface to which the acoustically resistive porous layer can be related directly or indirectly and by a second imaginary surface to which the reflective layer can be related directly or indirectly and comprises a large number of pipes that empty at the first surface, on the one hand, and at the second surface, on the other hand. These pipes are sealed by, on the one hand, the acoustically resistive porous layer, and, on the other hand, the reflective layer so as to form a cell.

A honeycomb is used for forming the alveolar substructure. Different types of materials can be used to form the honeycomb.

According to one embodiment, a honeycomb is obtained from strips arranged in a vertical plane that extends in a first direction, each strip being connected alternately to adjacent strips with spacing between each connecting zone. Thus, when the set of assembled strips is expanded in a direction that is perpendicular to the first direction, an alveolar panel is obtained, with the strips forming the side walls of the hexagonal cross-section pipes. This arrangement makes it possible to achieve high mechanical resistance to compression and bending.

In the case of an acoustic treatment structure, the complex is made flat; namely the acoustically resistive and reflective porous layers are connected to the alveolar substructure in a flat configuration.

Later, the complex is shaped at the surface to be treated. In the case of a flat wall or a cylindrical wall of a nacelle with a large diameter, this shaping can be achieved. It is different for the pipes with small diameters or the complex surfaces that cannot be developed, for example with two curvature radii such as an air intake of a nacelle.

These shaping difficulties are first derived from the very nature of the alveolar panel that has a high resistance to bending. Thus, when the alveolar panel is curved according to a first curvature radius that is oriented upward and arranged in a first plane, this tends to produce a curvature radius that is oriented downward and arranged in a plane that is approximately perpendicular to the first, whereby the alveolar panel assumes the shape of a saddle or a hyperbolic paraboloid.

These shaping difficulties are also derived from the nature of the connection, which is not elastic, between the alveolar substructure and the layers. Thus, since the honeycomb is produced flat under stress, its shaping embrittles it.

In any case, the shaping of the complex that is used as an acoustic treatment structure requires complex and expensive equipment and calls for substantial cycle time.

According to another problem, even if bending the complex is successful, the existing solution would not be satisfactory because the shaping entrains random deformations of the side walls of the pipes of the alveolar substructure even though it is difficult to determine the positioning of said side walls of the pipes, whereby the latter are hidden by the reflective and acoustically resistive layers.

Taking into account the difficulties of the shaping of the complex, the extent of the surfaces that are treated acoustically is limited to the inside of the pipes of the nacelle, whereby said treated surfaces do not extend at the lip of the air intake of a nacelle.

According to another significant constraint, the alveolar substructure is to be relatively airtight between two points that are spaced in the longitudinal direction so as not to create an air flow between these two points inside the acoustic treatment structure that can generate a stream that is disturbed at the aerodynamic surface.

Also, the purpose of this invention is to eliminate the drawbacks of the prior art by proposing an acoustic treatment structure that can be adapted to a complex surface, such as an air intake of an aircraft nacelle, relatively airtight between two points that are spaced in the longitudinal direction of said nacelle.

For this purpose, the invention has as its object an acoustic treatment structure related to a leading edge onto which an aerodynamic stream flows, in particular at an air intake of an aircraft nacelle, whereby said acoustic treatment structure comprises—from the outside to the inside—at least one acoustically resistive substructure, at least one alveolar substructure comprising strips of cells, arranged in a direction that is essentially perpendicular to the direction of flow of the aerodynamic stream, and at least one reflective layer, characterized in that each strip comprises a first part that insulates the strips from one another, called a support, with a U-shaped cross-section in the longitudinal direction, whose open surface that is opposite to the bottom of the U shape is flattened against the acoustically resistive substructure, and at least a second part, called partitioning, making it possible to partition the space that is delimited by the support and the acoustically resistive substructure into cells.

Other characteristics and advantages will emerge from the following description of the invention, a description that is provided only by way of example, relative to the accompanying drawings in which.

Figures 3A, 3B:
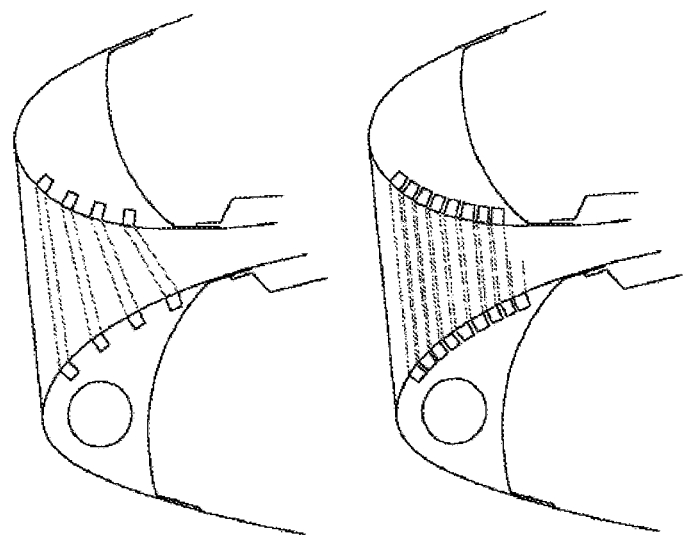
Figure 4:
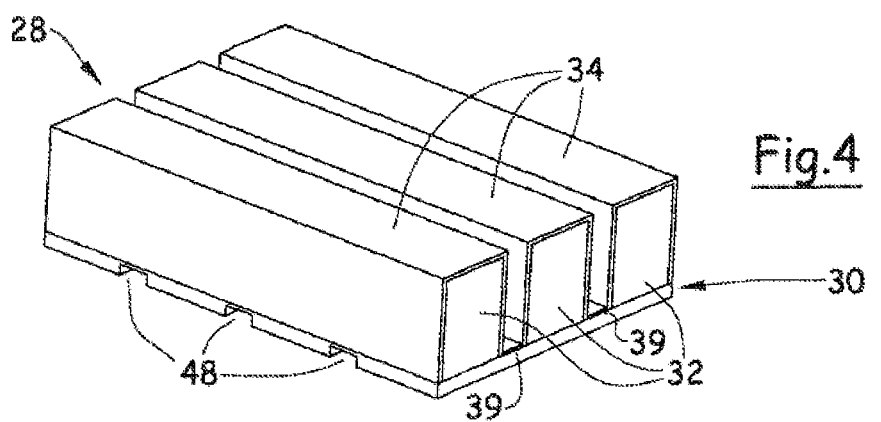
Figure 5:
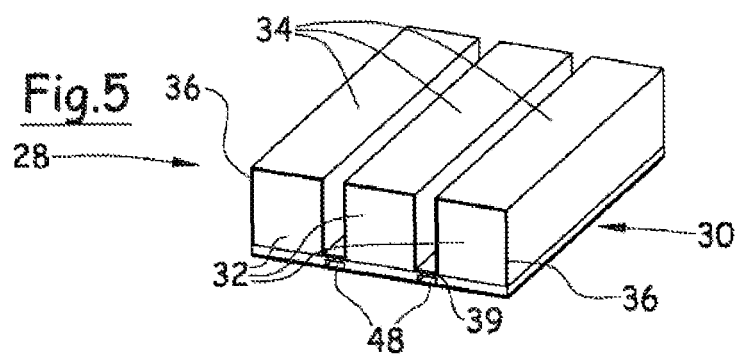

FIG. 3A is a cutaway of the front of a nacelle according to a first variant of the invention, FIG. 3B is a cutaway of the front of a nacelle according to another variant of the invention, FIG. 4 is a perspective view of a portion of an acoustic treatment structure according to a first variant of the invention, FIG. 5 is a perspective view of a portion of an acoustic treatment structure according to another variant of the invention, FIG. 6 is a perspective view of a portion of an acoustic treatment structure according to another variant of the invention, FIG. 7 is a perspective view of the acoustic treatment structure of FIG. 6 that illustrates the acoustically resistive substructure, FIG. 8 is a perspective view of another configuration of a part of an acoustic treatment structure according to the invention, FIG. 9 is a cutaway view that illustrates different configurations of frost treatment, FIG. 10 is a perspective view of a first part of the alveolar substructure, FIG. 11 is a perspective view of a second part of the alveolar substructure, FIG. 12 is a perspective view that illustrates a strip of the alveolar substructure that is obtained after the assembly of visible parts in FIGS. 10 and 11, FIG. 13 is a perspective view that illustrates another variant of a strip of the alveolar substructure, FIG. 14 is a perspective view that illustrates another variant of a strip of the alveolar substructure, FIG. 15 is a perspective view of rows of cells of the alveolar substructure during production, and FIG. 16 is a perspective view of a part of the alveolar substructure according to another embodiment.

This invention is now described applied to an air intake of a propulsion system of an aircraft. However, it can be applied to different leading edges of an aircraft or to different surfaces of an aircraft at which an acoustic treatment is performed.

Figure 1:
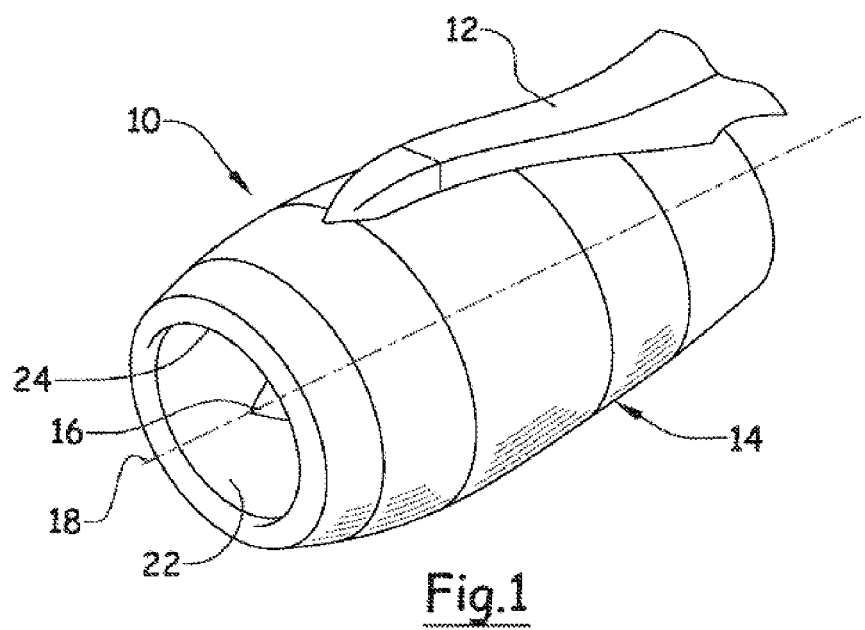
FIG. 1 is a perspective view of an aircraft nacelle.
Figure 2:
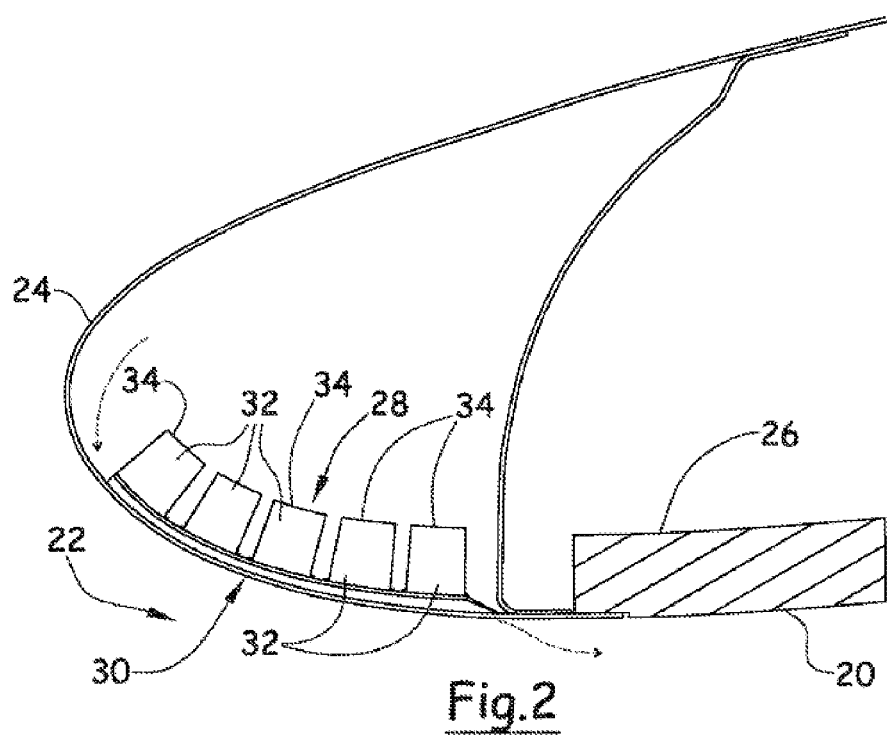
FIG. 2 is a cutaway along a longitudinal plane of the front of a nacelle.

FIG. 1 shows a propulsion system 10 of an aircraft that is connected under the wing by means of a mast 12. However, this propulsion system could be connected to other zones of the aircraft.

This propulsion system comprises a nacelle 14 in which a power plant that entrains a fan that is mounted on its shaft 16 is arranged essentially concentrically. The longitudinal direction corresponds to that of the axis of the nacelle that is referenced 18.

The nacelle 14 comprises an inside wall 20 that delimits a pipe with an air intake 22 at the front, whereby a first part of the incoming air stream, called primary stream, passes through the power plant to assist the combustion, and whereby the second part of the air stream, called secondary stream, is entrained by the fan and flows into an annular pipe that is delimited by the inside wall 20 of the nacelle and the outside wall of the power plant.

The front part 24 of the air intake 22 describes an essentially circular shape that extends in a plane that can be approximately perpendicular to the longitudinal axis 18, or not perpendicular, with the frontal part located just before 12 o'clock. However, other air intake forms can be considered.

According to the dimensions of the nacelle, the air intake can comprise a first small curvature radius that corresponds essentially to the radius of the pipe 20 in a plane that is perpendicular to the longitudinal direction as well as a second small curvature radius in a longitudinal plane, in particular between the pipe 20 and the leading edge of the air intake 22 of the nacelle.

Hereinafter, aerodynamic surface is defined as the shell of the aircraft that is in contact with the aerodynamic stream.

To limit the noise impact, an acoustic treatment structure 26 whose purpose is to absorb a portion of the sound energy, in particular by using the principle of Helmholtz resonators, is provided in particular at aerodynamic surfaces of the inside wall 20. In a known manner, this acoustic treatment structure, also called an acoustic panel, comprises—from the inside to the outside—a reflective layer, an alveolar substructure, and an acoustically resistive substructure.

As a variant, the acoustic treatment structure can comprise several alveolar substructures that are separated by acoustically resistive substructures that are called a septum.

An acoustic treatment structure 28 is provided at the air intake 22.

According to the invention, the acoustic treatment structure 28 comprises—from the outside to the inside—an acoustically resistive substructure 30, strips 32 of alveolar cells, arranged one beside another in a direction that is essentially perpendicular to the plane that contains a small curvature radius, namely a longitudinal plane in the case of an air intake 22 as well as at least one reflective layer 34.

In the case of an air intake of a nacelle, the strips 32 are insulated with respect to one another so as not to allow a flow of air between two points that are spaced in the longitudinal direction and are provided in two different strips. Consequently, this arrangement makes it possible to limit the risks of disturbances of the air stream entering the pipe 20 due to the intake of air inside the acoustic treatment structure because of negative pressure at a first point and its return outside of said structure at a second point.

So as to simplify the production, the strips 32 have a rectangular or square cross-section in a longitudinal plane. The strips 32 are separated to be able to be adapted to the curved profile of the acoustically resistive substructure 30, whereby the spacing between two strips tends to be reduced based on the separation with the acoustically resistive substructure.

Thus, the acoustic treatment structure according to the invention can be adapted to the surface that comprises a small curvature radius such as an air intake of a nacelle.

The strips 32 are arranged in a direction that is essentially perpendicular to the longitudinal plane to obtain air pressure equilibrium inside the cells of the same strip so as to limit the circulation of the air from one cell to the next.

According to another advantage, this configuration makes possible gradual damping of an impact, in particular a bird strike, owing to the capability of some of strips 32 to be able to articulate relative to others.

Finally, this configuration makes it possible to be able to combine an acoustic treatment with a frost treatment, the spacing between the strips making it possible to place channels at the acoustically resistive layer, between the strips 32, to channel the hot air that is used for the frost treatment at the outside surface of the air intake.

As illustrated in FIGS. 3A and 3B, the air intake of a nacelle does not have an axisymmetrical shape, whereby the treated zone at the bottom part has a length (in the longitudinal direction) that is more significant than that of the top part. Thus, according to FIG. 3A, the strips 32 can have a uniform cross-section over the entire circumference but are not parallel to one another and have spacing between them that varies over the circumference, whereby the spacing between two consecutive strips is larger in the bottom part than in the top part. As a variant, the strips 32 can have a tapered section over the circumference but a uniform spacing over the circumference. Thus, the cross-section of the strips is larger in the bottom part than in the top part.

As illustrated in FIG. 3B, the strips can be parallel, have a uniform cross-section and a uniform spacing. In this case, at least one strip does not extend over the entire circumference but only over the lower half of the circumference.

According to the variants, the strips 32 can have side walls that may or may not be parallel as illustrated in FIG. 8.

Advantageously, each strip 32 comprises a reflective layer, whereby the reflective layers are independent from one another. This configuration allows a better adaption of the strips 32 with the curved profile.

According to one embodiment, each strip 32 comprises a first part 36, called a support, with a U-shaped cross-section in the longitudinal direction, whose open surface that is opposite to the bottom of the U shape is flattened against the acoustically resistive substructure 30, and at least a second part 38, called a partitioning, makes it possible to partition the space that is delimited by the support 36 and the acoustically resistive substructure 30 into cells.

The U shape makes it possible to obtain boxes that are airtight relative to one another, limiting the propagation of an air stream inside the acoustic treatment structure in the longitudinal direction.

According to the variants, the separation of the U-shaped side walls can be constant over the entire circumference or can vary as illustrated in FIG. 8.

According to the variants, the support 36 can be metallic or made of composite material. According to the invention, the support 36 constitutes a reflective surface that ensures the function of the reflective layer 34.

If appropriate, the supports 36 of the different strips 32 are independent from one another, as illustrated in FIGS. 5, 6, 7, and 15, or connected to the acoustically resistive substructure, as illustrated in FIGS. 4 and 16. In this case, the acoustic treatment structure comprises a castellated support, as illustrated in FIG. 16, whereby the strips 32 are then connected to one another at the acoustically resistive substructure but can, however, be articulated relative to one another because of the possible deformation of the sole support at the edges of the support in contact with the acoustically resistive substructure.

In any case, the two branches of the U shape of the support 36 comprise—at their distal ends of the base—a flange 39 that offers a support surface that can be flattened against the acoustically resistive substructure so as to make the zone located inside the U-shaped support more airtight. This arrangement makes it possible to limit the risk of an air flow inside the acoustic treatment structure between two points of two different strips 32.

According to the variants, the flanges 39 between two consecutive supports are separate or are connected as illustrated in FIG. 16.

According to the variants, the flanges 39 can be oriented toward the outside of the U-shaped support or toward the inside of the U-shaped support.

According to a variant that is illustrated in FIG. 13, the partitioning 38 can comprise several walls that are independent from one another, for example in the form of cylinders that are arranged one behind another, or in the form of plates that extend in a longitudinal plane so as to delimit acoustic cells with the side walls of the support.

According to a preferred embodiment that is illustrated in FIGS. 8, 10, 11, 12, 14 and 15, the partitioning 38 comprises at least one corrugated plate 40 as illustrated in FIG. 8, in castellated form as illustrated in FIG. 10, or saw-tooth-shaped as illustrated in FIG. 14, whereby said plate is arranged perpendicular to the bottom of the U shape of the support 36 and alternately connects the two branches of the U, as illustrated in FIGS. 8, 12, and 14.

This arrangement makes it possible to obtain walls for separating cells in a simple manner that are held perpendicular to the bottom owing to their shapes without restoring attachment means such as welding points.

Thus, according to the variant that is illustrated in FIGS. 10, 12, and 15, the first walls 40.1 of the plate 40 are arranged perpendicular to the side walls 36.1 of the U-shaped support, and second walls 40.2 of the plate are arranged parallel to the side walls 36.1 and alternately flattened against one or the other of the side walls 36.1 of the U-shaped support when the partitioning 38 is placed in the support 36. Thus, the spacing between two walls 40.1 corresponds to a cell.

To immobilize the partitioning 38 in the support 36, welding points can be provided.

According to this configuration, the cells of each strip 32 are perfectly airtight with regard to the outside. Even if the cells of the same strip are not perfectly airtight relative to one another, this is not detrimental on the acoustic plane and can, if appropriate, make it possible to drain the water that has accumulated in the cells, if necessary.

Based on the frost treatment system (defrosting or de-icing), the strips 32 can be attached to the acoustically resistive substructure 30, one beside another or advantageously with spacing between them, so as to make it possible to arrange pipes for channeling the hot air in the case of a pneumatic defrosting system.

According to the invention, the acoustically resistive substructure 30 comprises filled zones and zones with orifices or microperforations that allow sound waves to pass through.

Preferably, the non-perforated filled zones come in the form of strips, a first series of strips 42 in a first direction and a second series of strips 44 in a second direction that is perpendicular to the first direction, as illustrated in FIG. 7.

According to one embodiment, the acoustically resistive substructure 30 can comprise several layers, at least one resistive layer comprising microperforations, for example a wire mesh, and at least one structural layer that comprises openings 46 that are delimited by strips 42 and 44, whereby the openings 46 make it possible to expose the microperforations of the resistive layer as illustrated in FIG. 7.

The strips 32 are added to the acoustically resistive substructure 30 so as to make the open surface that is opposite to the bottom of the support 36 coincide with the openings 46 of the structural layer. Certain strips 42 of the structural layer are wider and are arranged to the right of the spacing zones provided between the strips 32.

Preferably, the acoustically resistive substructure may or may not be preformed according to the shape of the surface at which the acoustic treatment structure is to be provided before the strips 32 are added.

According to the invention, it is possible to curve the acoustic treatment structure along a small curvature radius owing to the alveolar substructure in the form of strips 32 that allow a certain flexibility.

The acoustic treatment structure according to the invention also makes it possible for an acoustic treatment and a frost treatment to co-exist.

Thus, channels 48 can be provided at the acoustically resistive substructure 30. These channels 48 can extend in the same direction as the strips 32, as illustrated in FIGS. 5, 6 and 7, or in a direction that is perpendicular to said strips 32, as illustrated in FIG. 4. According to the variants that are illustrated in FIG. 9, the channels 48 can be arranged to the right of the spacing zones that are provided between the strips 32 or can be arranged at the side walls 36 of the strips.

According to an embodiment that is illustrated in FIGS. 6 and 7, the acoustically resistive substructure 30 comprises at least two layers, a first layer 50 that is flat or that has a profile that is adapted to the surface at which the acoustic treatment structure is provided, and a second layer 52 that is inserted between the first layer 50 and the strips 32, comprising furrows 54 that form the channels 48 when the two layers 50 and 52 are flattened against one another.

As illustrated in FIG. 9, the frost treatment can be obtained by circulation of hot air between the strips that may or may not pass through the acoustically resistive structure 30.

Although described for an air intake, the acoustic treatment structure according to the invention is not limited to this application. Thus, this structure could be applied to other surfaces of the aircraft, for example the leading edge of the wings.

The acoustic treatment structure according to the invention is more particularly adapted to a surface that comprises at least one small curvature radius.

The invention claimed is:

1. An acoustic treatment structure for a leading edge onto which an aerodynamic stream flows, from the outside to the inside, comprising:
   at least one acoustically resistive substructure (30),
   at least one alveolar substructure comprising strips (32) of cells, arranged in a direction that is essentially perpendicular to the direction of flow of the aerodynamic stream, and
   at least one reflective layer (34),
   wherein each strip (32) of cells comprises
   i) a first support part (36) with a U-shaped cross-section in the longitudinal direction, and an open surface that is opposite to the bottom of the U shape, the open surface flattened against the acoustically resistive substructure (30), the first support part (36) made in one piece that obtains boxes that are airtight relative to one another, the first support part (36) delimiting a space within the U shape and the acoustically resistive substructure (30), and
   ii) at least a second partitioning part (38) partitioning the space delimited by the support (36) and the acoustically resistive substructure (30) into cells,
   wherein each strip (32) of cells is displaced from an adjacent strip (32) of cells by a predetermined distance to form a plurality of flexibility regions on the acoustically resistive substructure (30) arranged longitudinally between the strips (32) of cells,
   wherein the acoustic treatment structure is constructed and arranged to conform to a shape of the leading edge by flexing along the flexibility regions of the acoustically resistive structure (30);
   wherein the two U-shaped branches of the support part (36) comprise—at their distal ends of the base—a flange (39) that offers a support surface that can be flattened against the acoustically resistive substructure (30).

2. Acoustic treatment structure according to claim 1, wherein the support parts (36) of the strips are connected to the acoustically resistive substructure (30).

3. Acoustic treatment structure according to claim 1, wherein the partitioning part (38) comprises a plate (40) whose shapes make it possible to alternately connect the side walls of the support (36) in a U, arranged perpendicularly to the bottom of the support part (36).

4. Acoustic treatment structure according to claim 1, wherein the acoustically resistive substructure (30) comprises plural layers comprised of i) at least one resistive layer that comprises microperforations and ii) at least one structural layer that comprises filled zones for taking up stresses delimiting openings (46) that release microperforations of the resistive layer, and
   wherein the strips (32) are attached to the acoustically resistive substructure (30) so as to make the spacing between the strips (32) coincide with a filled zone.

5. Acoustic treatment structure according to claim 4,
   wherein the at least one resistive layer is disposed between the at least one structural layer and the at least one alveolar substructure,
   wherein the filled zones are non-perforated and arranged in a plurality of strips, a first series of the plurality of strips being arranged in a first direction, a second series of the plurality of strips being arranged in a second direction perpendicular to the first direction, at least some of the first series of the plurality of strips coinciding with the plurality of flexibility regions on the acoustically resistive substructure (30),
   wherein each opening (46) is defined by two strips from the first series of the plurality of strips and two strips from the second series of the plurality of strips.

6. Acoustic treatment structure according to claim 1, wherein the acoustically resistive substructure (30) comprises channels (48) that are designed for the hot air of a defrosting system.

7. Acoustic treatment structure according to claim 6, wherein the channels (48) are disposed along the plurality of flexibility regions between adjacent strips (32) of cells.

8. Aircraft nacelle comprising an air intake that comprises—at at least one part of its surface—an acoustic treatment structure according to claim 1.

9. Acoustic treatment structure according to claim 1, wherein the support parts (36) of the strips are connected to the acoustically resistive substructure (30).

10. An acoustic treatment structure for a leading edge onto which an aerodynamic stream flows, from the outside to the inside, comprising:
    an acoustically resistive substructure (30);
    at least one alveolar substructure comprising plural strips (32) of cells, arranged in a direction essentially perpendicular to a direction of flow of the aerodynamic stream, the strips (32) of cells being insulated with respect to one another so as not to allow a flow of air between two points that are spaced in a longitudinal direction and are provided in two different strips; and
    a reflective layer (34),
    wherein each strip (32) of cells comprises
    i) a support part (36) with a one-piece U-shaped cross-section in the longitudinal direction, and an open surface that is opposite to a bottom of the U shape, the open surface connected against the acoustically resistive substructure (30), the support part (36) made in one piece that obtains boxes that are airtight relative to one another, the support part (36) delimiting a space within the U shape and the acoustically resistive substructure (30), and
    ii) a partitioning part (38) partitioning the space delimited by the support (36) and the acoustically resistive substructure (30) into acoustic cells, and
    wherein the reflective layer (34) is located on the bottom of the U shape,
    wherein each strip (32) of cells is displaced from an adjacent strip (32) of cells by a predetermined distance to form a plurality of flexibility regions on the acoustically resistive substructure (30) arranged longitudinally between the strips (32) of cells,
    wherein the acoustic treatment structure is constructed and arranged to conform to a shape of the leading edge by flexing along the flexibility regions of the acoustically resistive structure (30);
    wherein each support part (36) is independent from the other support parts (36) and not in contact with each other, wherein each support part (36) comprises a flange (39) connecting the open surface against the acoustically resistive substructure (30).

11. The acoustic treatment structure of claim 10, wherein, each support part (36) connected with an adjacent support part (36), and adjacent support parts (36) sharing a flange (39) connecting the open surface against the acoustically resistive substructure (30).

12. The acoustic treatment structure of claim 10, wherein the partitioning part (38) comprises a corrugated plate (40) extending in the longitudinal plane so as to delimit the acoustic cells within side walls of the support part (36).

13. The acoustic treatment structure of claim 10, wherein the partitioning part (38) comprises a castellated form (40) extending in the longitudinal plane so as to delimit the acoustic cells within side walls of the support part (36).

14. The acoustic treatment structure of claim 10, wherein the partitioning part (38) comprises a saw-tooth-shape (40) extending in the longitudinal plane so as to delimit the acoustic cells within side walls of the support part (36).

15. The acoustic treatment structure of claim 10, wherein the partitioning part (38) comprises plural walls independent of each other and each wall defining a cylinder (40), the plural walls defining plural cylinders (40) arranged one behind another.

16. The acoustic treatment structure of claim 10, in combination with an aircraft nacelle.

17. The acoustic treatment structure of claim 10, wherein the acoustically resistive substructure (30) comprises plural layers comprised of i) at least one resistive layer that comprises microperforations and ii) at least one structural layer that comprises filled zones for taking up stresses delimiting openings (46) that release microperforations of the resistive layer, and wherein the strips (32) are attached to the acoustically resistive substructure (30) so as to make the spacing between the strips (32) coincide with a filled zone, wherein the at least one resistive layer is disposed between the at least one structural layer and the at least one alveolar substructure, wherein the filled zones are non-perforated and arranged in a plurality of strips, a first series of the plurality of strips being arranged in a first direction, a second series of the plurality of strips being arranged in a second direction perpendicular to the first direction, at least some of the first series of the plurality of strips coinciding with the plurality of flexibility regions on the acoustically resistive substructure (30), wherein each opening (46) is defined by two strips from the first series of the plurality of strips and two strips from the second series of the plurality of strips.

18. The acoustic treatment structure of claim 10, wherein the acoustically resistive substructure (30) comprises channels (48) that are designed for the hot air of a defrosting system, wherein the channels (48) are disposed along the plurality of flexibility regions between adjacent strips (32) of cells.

* * * * *

UNITED STATES PATENT AND TRADEMARK OFFICE
CERTIFICATE OF CORRECTION

PATENT NO. : 8,413,922 B2
APPLICATION NO. : 12/809742
DATED : April 9, 2013
INVENTOR(S) : Alain Porte et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 174 days.

Signed and Sealed this
Fourteenth Day of May, 2013

Teresa Stanek Rea
*Acting Director of the United States Patent and Trademark Office*